United States Patent
Kuhn et al.

(10) Patent No.: US 7,124,487 B2
(45) Date of Patent: Oct. 24, 2006

(54) METHOD FOR CONTROLLING CARBON FORMATION ON REPAIRED COMBUSTOR LINERS

(75) Inventors: Terrel E. Kuhn, Mesa, AZ (US); William G. Freeman, Fountain Hills, AZ (US); Francis S. Maszk, Tempe, AZ (US); Douglas P. Freiberg, Phoenix, AZ (US); Kenneth A. Struzek, Gilbert, AZ (US); Lawrence A. Kobold, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 252 days.

(21) Appl. No.: 10/774,230

(22) Filed: Feb. 5, 2004

(65) Prior Publication Data

US 2006/0207095 A1    Sep. 21, 2006

Related U.S. Application Data

(63) Continuation-in-part of application No. 10/755,560, filed on Jan. 9, 2004, now Pat. No. 6,868,675.

(51) Int. Cl.
*B23P 17/04* (2006.01)
*B21D 53/00* (2006.01)
*F02C 1/00* (2006.01)

(52) U.S. Cl. .............. 29/401.1; 29/402.01; 29/402.08; 29/402.11; 29/890.01

(58) Field of Classification Search ............. 29/890.01, 29/401.1, 402.01, 402.03, 402.05, 402.06, 29/402.07, 402.08, 402.09, 402.11, 402.16, 29/889; 60/752, 772

See application file for complete search history.

(56) References Cited

U.S. PATENT DOCUMENTS

| | | | | | |
|---|---|---|---|---|---|
| 2,699,648 | A | * | 1/1955 | Berkey | 60/756 |
| 3,842,595 | A | * | 10/1974 | Smith et al. | 60/804 |
| 4,030,288 | A | * | 6/1977 | Davis et al. | 60/791 |
| 4,206,865 | A | * | 6/1980 | Miller | 228/152 |
| 4,232,527 | A | | 11/1980 | Reider | |
| 4,614,082 | A | | 9/1986 | Sterman et al. | |
| 5,261,223 | A | | 11/1993 | Foltz | |
| 5,471,743 | A | * | 12/1995 | Munroe et al. | 29/889.3 |
| 5,758,504 | A | | 6/1998 | Abreu et al. | |
| 5,799,491 | A | | 9/1998 | Bell et al. | |
| 5,918,467 | A | | 7/1999 | Kwan | |
| 6,021,570 | A | * | 2/2000 | Lockyer et al. | 29/890.01 |
| 6,079,199 | A | | 6/2000 | McCaldon et al. | |

(Continued)

*Primary Examiner*—Essama Omgba
(74) *Attorney, Agent, or Firm*—Ingrassia Fisher & Lorenz

(57) ABSTRACT

A method for controlling combustor liner carbon formation on repaired combustors includes making modular effusion panel subassemblies remote from the combustor liner; removing a non-effusion or damaged panel from the combustor liner; and replacing the non-effusion or damaged panel with the modular effusion panel.

26 Claims, 8 Drawing Sheets

U.S. PATENT DOCUMENTS

| | | |
|---|---|---|
| 6,101,814 A | 8/2000 | Hoke et al. |
| 6,345,441 B1 * | 2/2002 | Farmer et al. ............. 29/889.1 |
| 6,530,971 B1 | 3/2003 | Cohen et al. |
| 6,546,731 B1 | 4/2003 | Alkabie et al. |
| 6,568,079 B1 | 5/2003 | Farmer et al. |
| 6,568,187 B1 * | 5/2003 | Jorgensen et al. ............ 60/752 |
| 6,581,285 B1 | 6/2003 | Emilianowicz |
| 6,640,547 B1 * | 11/2003 | Leahy, Jr. .................... 60/752 |
| 6,651,437 B1 * | 11/2003 | Farmer et al. ................ 60/752 |
| 6,691,519 B1 * | 2/2004 | Little ........................ 60/798 |
| 6,868,675 B1 * | 3/2005 | Kuhn et al. .................. 60/772 |
| 6,904,676 B1 * | 6/2005 | Emilianowicz .......... 29/890.01 |
| 6,986,201 B1 * | 1/2006 | Moertle et al. .......... 29/890.01 |
| 7,036,316 B1 * | 5/2006 | Howell et al. ............... 60/772 |
| 2003/0066821 A1 | 4/2003 | Wybrow et al. |
| 2004/0103665 A1 * | 6/2004 | Farmer et al. ................ 60/752 |
| 2006/0021219 A1 * | 2/2006 | Caldwell et al. ........... 29/889.1 |

* cited by examiner

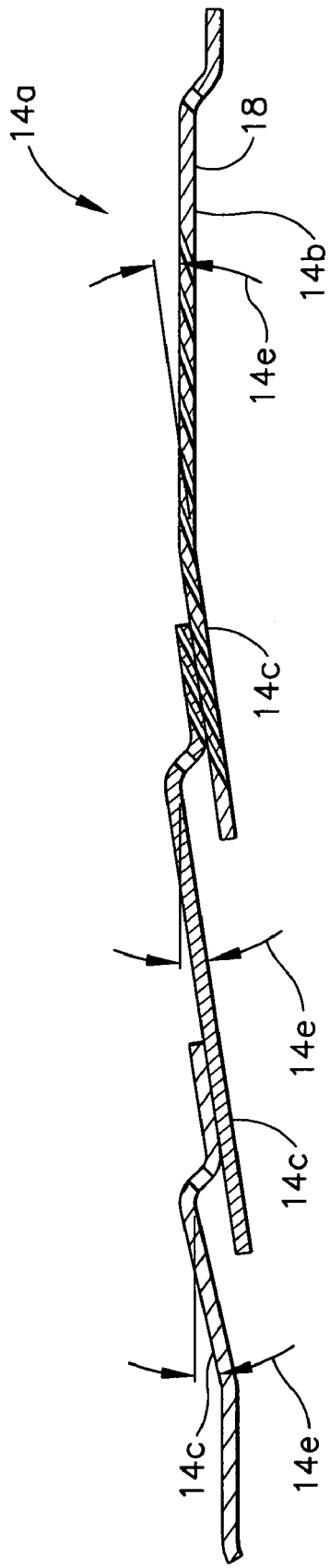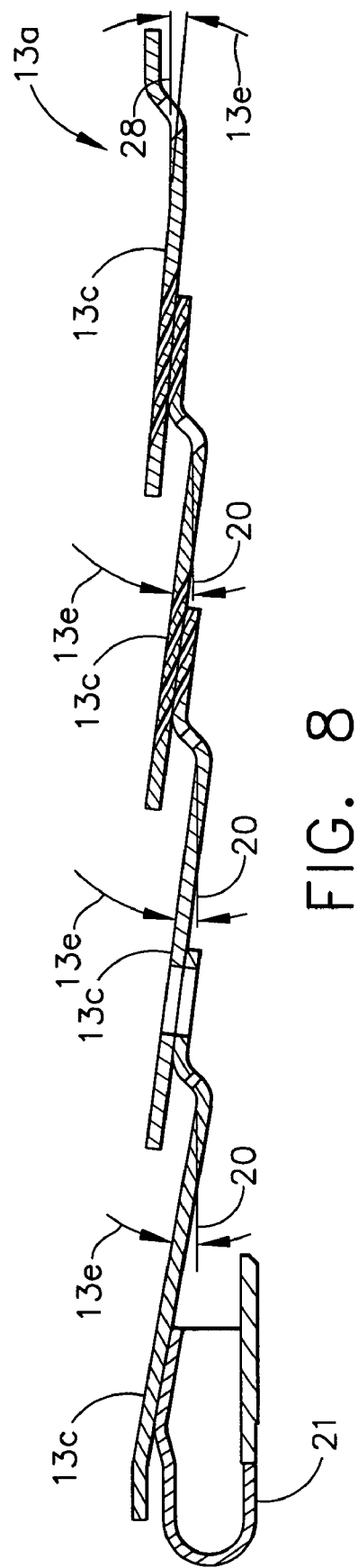

METHOD FOR CONTROLLING CARBON FORMATION ON REPAIRED COMBUSTOR LINERS

CROSS REFERENCE TO RELATED APPLICATIONS

This application is a continuation-in-part of U.S. application Ser. No. 10/755,560, filed Jan. 9, 2004 now U.S. Pat. No. 6,868,675.

BACKGROUND OF THE INVENTION

This invention generally relates to combustor liners, such as those used on Honeywell TPE331-10, TPE331-11, and TPE331-12 series turbine aircraft engines and, more particularly, to methods for controlling carbon formation within such repaired combustor liners and constructing such combustor liners.

A turbine engine typically includes a compressor section, combustion section, and a turbine section. Within the combustion section is the combustor liner wherein fuel is burned producing a hot gas usually at an intensely high temperature. To prevent this high temperature heat from damaging the combustor liner before it exits to the turbine section, the interior of the combustor liner is provided with effusion holes and film cooling, and may include thermal barrier coating. This combustor liner can be created by securing a series of panels together in series with one panel being secured to a dome assembly. The effusion holes and film cooling, and thermal barrier coating, of the combustor liner prevents the intense combustion heat from damaging the combustor liner as well as the rest of the engine. The combustor liner, however, becomes very hot in the process.

A negative effect of the intense heat in the combustion process is the build-up of carbon on the combustion liner near the dome assembly. Over time, the carbon build-up can break off the combustion liner and pass through the turbine section. When this occurs, the carbon build-up may strike the turbine blades located therein, causing damage to those blades. This reduces the life span of the turbine blades and requires more frequent repairs to the engine.

U.S. Pat. Nos. 6,581,285 and 6,568,079 describe a method of replacing combustor liner panels. The inner and outer liners include a series of panels and between which are nuggets. The inner and outer liners are attached to a dome assembly by respective bolt bands that enable fasteners to be removed and re-attached to the liners and dome assembly. In the event of a damaged panel, a cut is made through at least one panel or nugget to remove the damaged panel and replace it with new panel. However, some of the disadvantages of this method include distortion and blockage of the cooling air metering holes if the cut and subsequent weld is in the nugget adjacent to such holes. Loss of thermal barrier coating can result if the cut and subsequent weld is in the area of the thermal barrier coated panel. The use of fasteners for assembling combustor liners can affect the combustion process and engine performance, due to leakage of air around such fasteners, and the loss of heat transfer through this joining method.

A combustor liner developed by the applicants herein is shown in partial cross-section in FIG. 1. In this combustor liner 100, a generally cylindrical outer liner subassembly 102 encloses a generally cylindrical inner liner subassembly 103, both of which are integrated (i.e., non-modular) with a dome subassembly 110. The inner liner subassembly 103 includes a plurality of inner panels 103a of decreasing diameter 113 with one of the panels 103a integrated with the dome subassembly 110. The inner panel integrated with the dome assembly 110 includes four rows of 181 effusion holes 104, while the panel that is second closest to the dome assembly includes five rows of 206 effusion holes 104.

Likewise, and as better shown in FIG. 2, the outer liner subassembly 102 is made up of plurality of outer panels 102a, of which one is integrated (i.e., non-modular) with the dome assembly 110. Each panel 102a has a decreasing diameter 112, (FIG. 1) to accommodate the attachment of the panels to one another. Eleven rows 106 of effusions holes 108 are in the outer panel 102a closest to the dome assembly 110. A first group 105a of seven rows 106, which are the closest rows to the dome assembly 110, has 239 effusion holes in each row. A second group 105b of four rows 106, which are the farthest rows to the dome assembly, has 281 effusion holes in each row. The effusion hole configuration, however, can stress the panel closest to the dome assembly 110, resulting in a shorter lifespan of the outer liner subassembly 102 and consequently the entire combustor liner 100 since the inner and outer liner subassemblies are integrated with the dome assembly.

As can be seen, there is a need to improve the ease of replacement of either the inner and/or outer liner subassemblies to eliminate the need to replace the entire combustor liner.

SUMMARY OF THE INVENTION

In one aspect of the present invention, a method of converting a non-effusion combustor liner to an effusion combustor liner comprises making a modular inner effusion panel subassembly and a modular outer effusion panel subassembly remote from the non-effusion combustor liner removing the non-effusion inner panel and the non-effusion outer panel from the non-effusion combustor liner and replacing the non-effusion panels with the modular effusion panels.

In another aspect of the present invention, a method of converting a non-effusion combustor liner to an effusion combustor liner comprises making a first modular effusion liner panel subassembly remote from the non-effusion combustor liner; removing a first non-effusion liner panel subassembly from the non-effusion combustor liner; replacing the first non-effusion liner panel subassembly with the first modular effusion liner panel subassembly; wherein the first modular effusion liner panel subassembly includes six rows of first effusion holes proximate to one end of the first modular effusion liner panel subassembly and wherein at least one of the six rows includes 239 first effusion holes; and five rows of second effusion holes distal from the one end of the first modular effusion liner panel subassembly and wherein at least one of the five rows includes 281 second effusion holes.

In another aspect of the present invention, a method of converting a non-effusion combustor liner to an effusion combustor liner comprises making a second modular effusion liner panel subassembly remote from the non-effusion combustor liner; removing a second non-effusion liner panel subassembly from the non-effusion combustor liner; replacing the second non-effusion liner panel subassembly with the second modular effusion liner panel subassembly; wherein the second modular effusion liner panel subassembly includes four rows of third effusion holes proximate to one end of the modular second effusion liner panel subassembly and wherein at least one of the four rows includes 181 third effusion holes; and five rows of forth effusion holes distal from the one end of the second modular effusion liner panel subassembly and wherein at least one of the five rows includes 206 second effusion holes.

In yet another aspect of the present invention, a method of repairing a combustor liner comprises making a first modular effusion panel of a first liner panel subassembly remote from the combustor liner; removing a first damaged panel from the combustor liner; replacing the first damaged panel with the first modular effusion panel; wherein the first modular effusion panel includes six rows of first effusion holes proximate to one end of the first modular effusion panel and wherein at least one of the six rows includes 239 first effusion holes; and five rows of second effusion holes distal from the one end of the first modular effusion panel and wherein at least one of the five rows includes 281 second effusion holes.

In yet another aspect of the present invention, a method of repairing a combustor liner comprises making a second modular effusion panel of a second liner panel subassembly remote from the combustor liner; removing a second damaged panel from the combustor liner; replacing the second damaged panel with the second modular effusion panel; wherein the second modular effusion panel includes four rows of third effusion holes proximate to one end of the second modular effusion panel and wherein at least one of the four rows includes 181 third effusion holes; and five rows of forth effusion holes distal from the one end of the second modular effusion panel and wherein at least one of the five rows includes 206 forth effusion holes.

In yet a further aspect of the present invention, a method of repairing a combustor liner comprises making a modular effusion panel of a liner panel subassembly remote from the combustor liner; removing a damaged panel from the combustor liner; replacing the damaged panel with the modular effusion panel; wherein the effusion panel comprises one of a first modular effusion panel and a second modular effusion panel; the first modular effusion panel including six rows of first effusion holes proximate to one end of the first modular effusion panel and wherein at least one of the six rows includes 239 first effusion holes; and five rows of second effusion holes distal from the one end of the first modular effusion panel and wherein at least one of the five rows includes 281 second effusion holes; the second modular effusion panel including one of four rows of third effusion holes and wherein at least one of the four rows includes 181 third effusion holes; and five rows of fourth effusion holes and wherein at least one of the five rows includes 206 fourth effusion holes.

These and other features, aspects and advantages of the present invention will become better understood with reference to the following drawings, description and claims.

BRIEF DESCRIPTION OF THE DRAWINGS

FIG. 7 is a cross-sectional view of the modular outer panel subassembly depicting the angles of the individual panels according to an embodiment of the present invention;

FIG. 8 is a cross-sectional view of the modular inner panel subassembly depicting the angles of the individual panels according to an embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a combustor liner repair method that can be used on Honeywell TPE331-10, TPE331-11, and TPE331-12 series turbine aircraft engines, and could apply to other turbine aircraft engines. More particularly, the present invention provides a method for providing effusion characteristics to an in-service combustor liner, but is lacking in effusion characteristics. Also provided by the present invention is a method of repairing an in-service combustor liner that already has effusion characteristics but may have been damaged.

From either of the foregoing methods, the end-result is a combustor liner that is modular in design and prevents the formation of carbon-build up on the inner surfaces of the inner and outer panel subassemblies by introducing sweeping air through a series of effusion holes located proximate to a dome assembly. These effusion holes are positioned in a configuration that minimizes stress to the panel. Also, the individual panels are configured with an angle that improves carbon removal and manufacturability. The modular design permits the shipment of completely finished inner and outer panel subassemblies, including drilling of effusion holes and thermal barrier coating to facilitate repair of existing combustor liners.

The foregoing characteristics of the present invention, among others, are in contrast to past combustor liners that were integral in design and, thus, more difficult to repair. Also, the past effusion row/hole configuration tended to increase stress at a panel area that transitioned from flat to angled.

Figure 3:
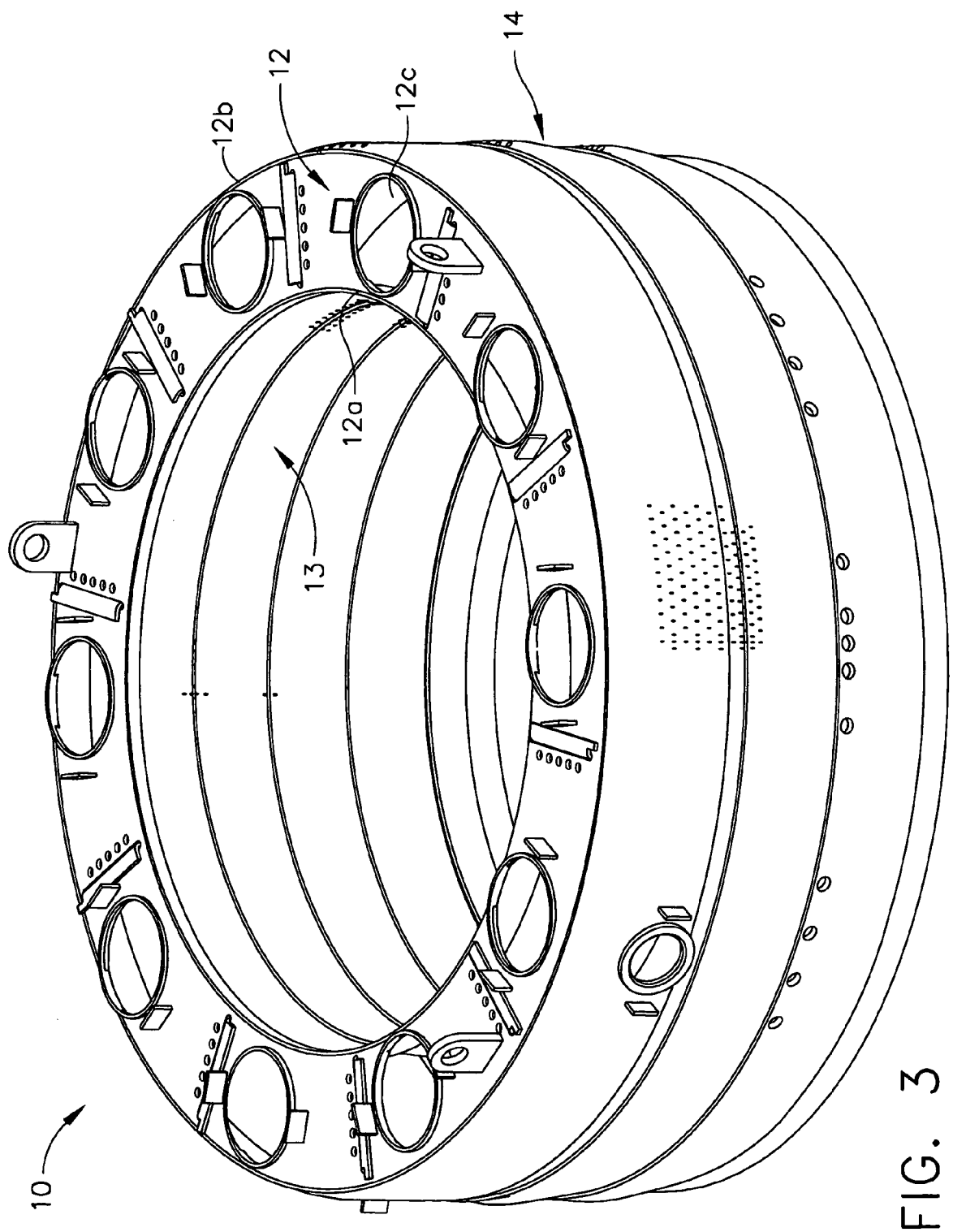
FIG. 3 is a perspective view of a combustor liner according to an embodiment of the present invention.

As shown in FIG. 3, an embodiment of the combustor liner 10 of the present invention may comprise a generally cylindrical, modular inner panel subassembly 13 encircled by a modular outer panel subassembly 14, both of which are removeably affixed to a dome subassembly 12. Thereby, fuel and air may enter inlets 12c; combust between the panel subassemblies 13, 14; and exit from an outlet (not shown) at an end of the combustor liner 10 opposite the inlets 12c and into a turbine section (not shown).

Figure 4:
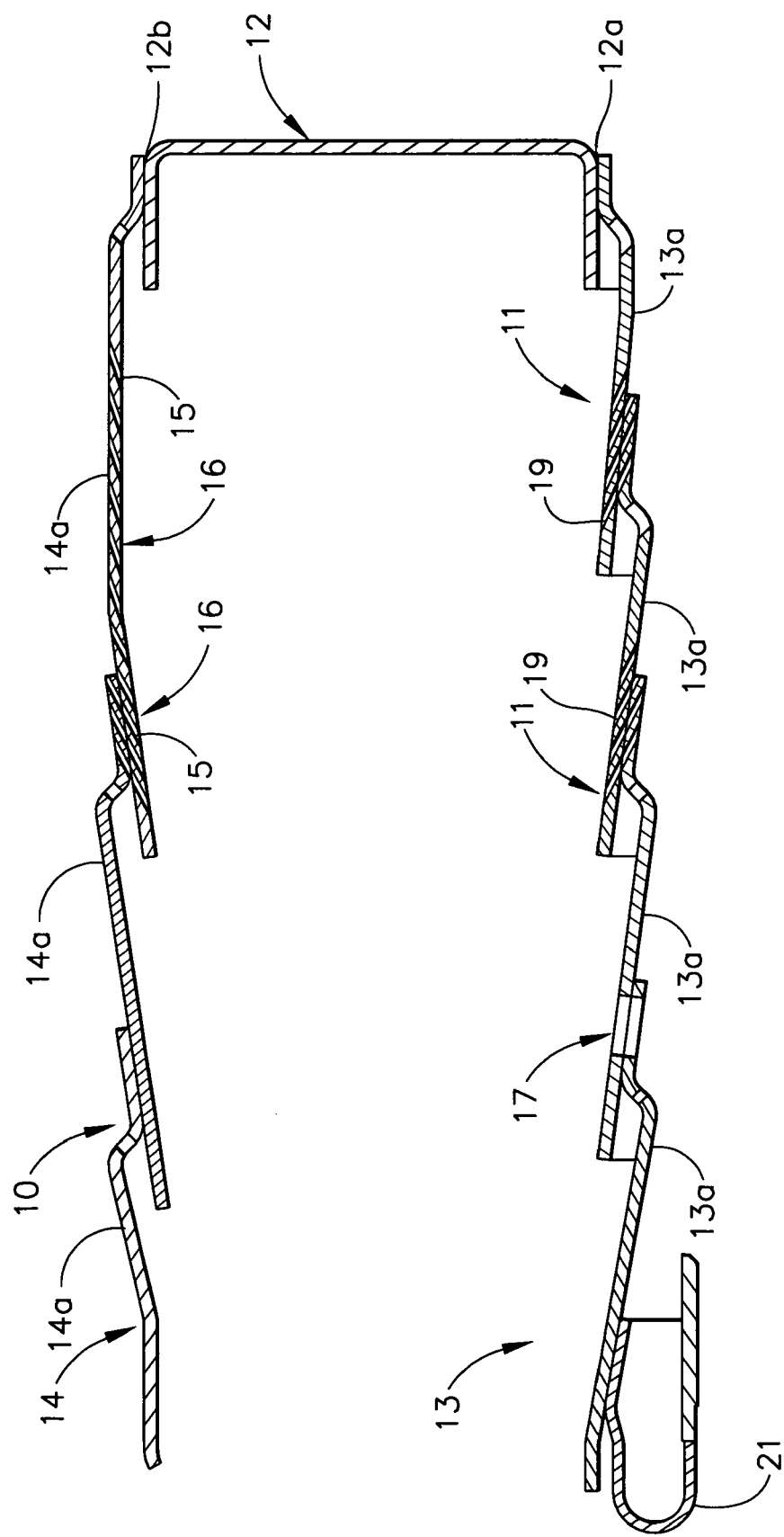
FIG. 4 is a partial, cross-sectional side view of a combustor liner according to an embodiment of the present invention.

In FIG. 4, a view of a combustor liner 10 shows a modular inner panel subassembly 13 with a plurality of serially connected inner panels 13a, which in this example includes four inner panels 13a. The inner panel 13a closest to the dome subassembly 12 may be removeably affixed, such as by welding and/or brazing, at a point 12a to the dome subassembly. The inner panel 13a that is most distal from the dome subassembly 12 may be removeably affixed, such as by welding and/or brazing, to a support 21 which mates with the turbine section.

The modular outer panel subassembly 14 may include a plurality of serially connected outer panels 14a, which in this example includes three outer panels 14a. The panel 14a closest to the dome subassembly 12 may be removeably affixed, such as by welding and/or brazing, at a point 12b to the dome subassembly. The panel 14a that is most distal from the dome subassembly 12 is left un-affixed and channels gas flow to the turbine section, by way of an outer transition liner (not shown). Each outer panel 14a and inner panel 13a may be affixed to one another, such as by welding and/or brazing. The braze alloys used for brazing any of the above may have differing melting points to facilitate brazing at one point without melting the braze at another point. The same may apply when welding.

As shown in FIG. 4, one or more of the inner panels 13a may include one or more of rows of dilution hole 17, as well as one or more rows 11 each having one or more effusion holes 19. The dilution holes 17 and/or effusion holes 19 may cover all or a portion of the entire circumference of the modular inner panel subassembly 13. For one embodiment each dilution hole may have a diameter between $187/1000$ and about $229/1000$ inches. In the example shown in FIG. 4, the inner panel 13a closest to the dome subassembly 12 may include four rows 11, with each row 11 having the same or different number of effusion holes 19. In one embodiment, the four rows 11 may each have 181 effusion holes 19. The example of FIG. 4 also depicts the inner panel 13a that is the second closest to the dome subassembly 12 with five rows 11, with each row 11 having the same or different number of effusion holes 19. In an embodiment, the five rows 11 may each have 206 effusion holes 19.

As an example, the effusion holes 19 may have a diameter between about $17/1000$ to $23/1000$ inches, and be at an angle to a horizontal reference line between about 26 to 28 degrees.

Figure 5:
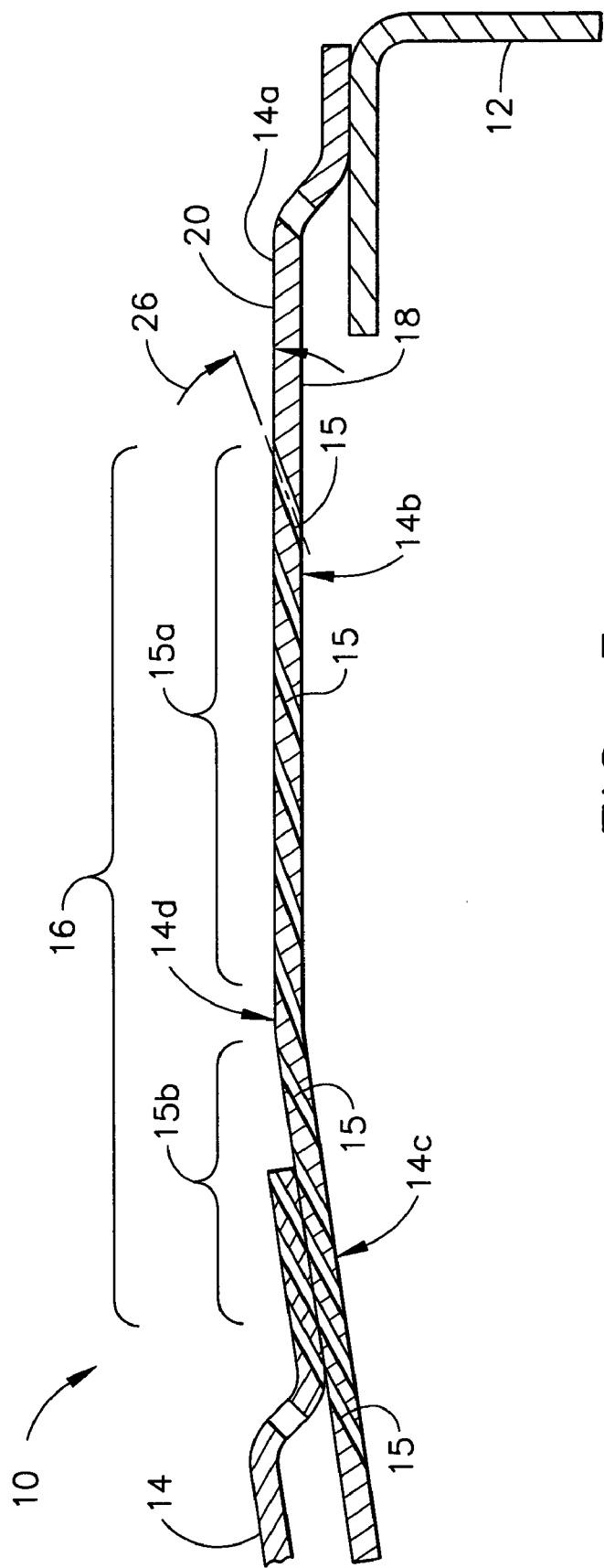
FIG. 5 is an enlarged, partial view of the outer panel shown in FIG. 4.

Similar to the inner panels 13a, and in referring to FIGS. 4 and 5, one or more of the outer panels 14a may include one or more of rows of dilution holes (not shown), as well as one or more of the outer panels 14a may include one or more of rows 16 each having one or a plurality of effusion holes 15. The dilution holes and/or effusion holes 15 may cover all or a portion of the entire circumference of the modular outer panel subassembly 14. For one embodiment, each dilution hole may have a diameter of about $230/1000$ inches. In the example shown in FIG. 4, the rows 16 may be divided into subgroups, such as a first group and a second group. In an embodiment, the outer panel 14a closest to the dome subassembly 12 may include a first group 15a, and as better shown in FIG. 5, of six rows 16, with each row 16 having the same or different number of effusion holes 15. In one embodiment, the six rows 16 may each have 239 effusion holes 15. The example of FIG. 4, and as better shown in FIG. 5, also depicts the outer panel 14a that is the closest to the dome subassembly 12 with a second group 15b of five rows 16 that are distal (in comparison to the first group 15a) from the dome subassembly 12, with each row 16 having the same or different number of effusion holes 15. In an embodiment, the five rows 16 may each have 281 effusion holes 15.

It should be understood that the number of dilution holes and rows of dilution holes, and number of effusion holes and rows of effusion holes is illustrative and not meant to be limiting. The number of effusion holes and number of rows can be dependent upon the specific dimensions of the combustor liner 10. Nevertheless, the number of possible combinations of numbers of rows of dilution and effusion and the number of dilution and effusion holes at any point along the outer panel 14a is extremely large. Therefore, adding/subtracting a row(s) and/or adding/subtracting a hole(s) in any row(s) is not necessarily obvious in terms of achieving a reduction in carbon build-up.

Referring to FIG. 5, it can be seen in the exemplary embodiment that the first group 15a of rows 16 can be on a relatively flat portion 14b of the outer panel 14a, while the second group 15b of rows 16 can be on a relatively angled portion 14c of the modular outer panel subassembly 14a. Between the flat portion 14b and angled portion 14c can be a transition area 14d of the modular outer panel subassembly 14a. In the past liner design shown in FIG. 2, a similar transition area 102d between a flat portion 102b and angled portion 102c exists.

Figure 1:
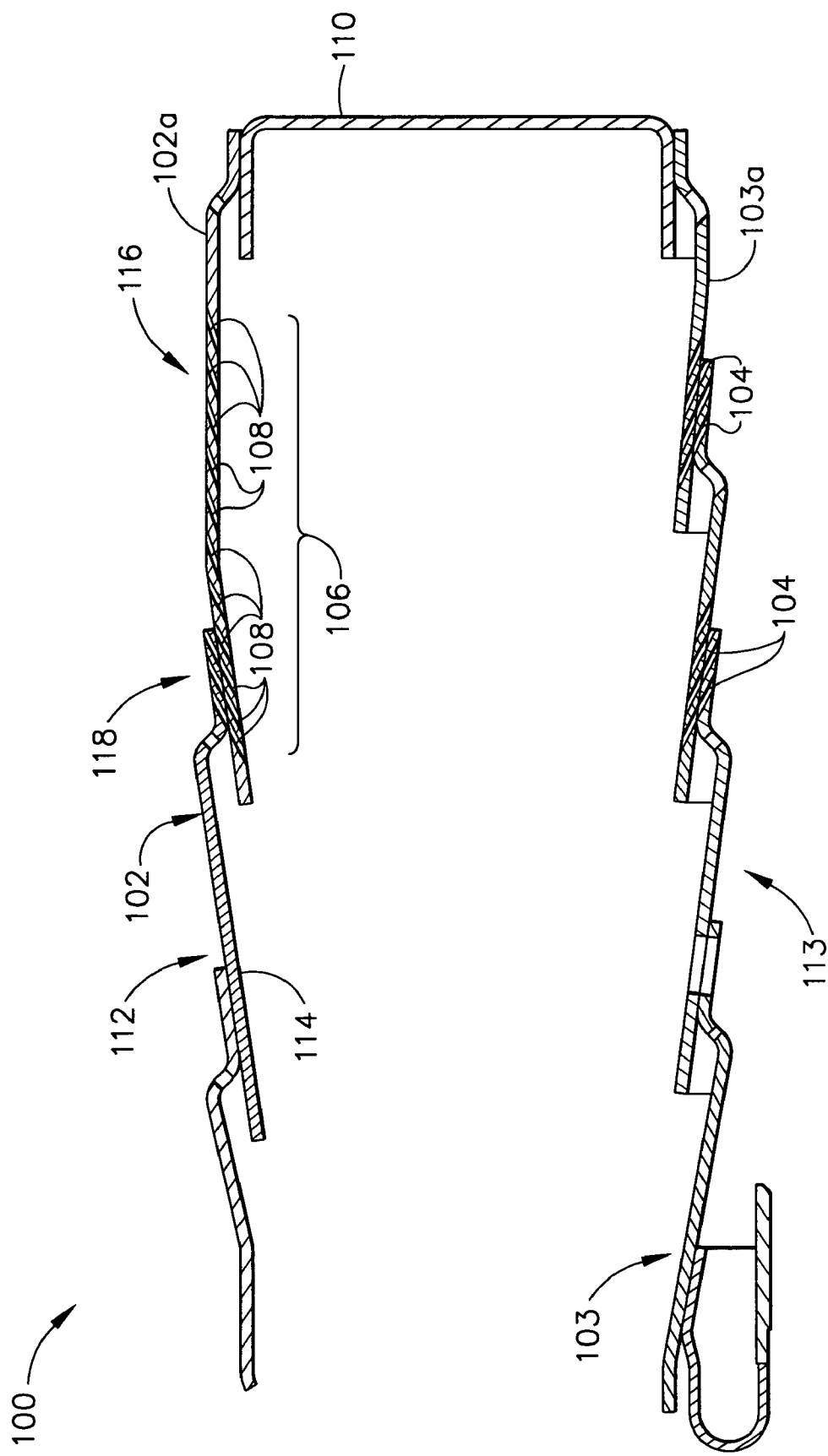
FIG. 1 is a partial, cross-sectional side view of a prior art combustor liner.
Figure 2:
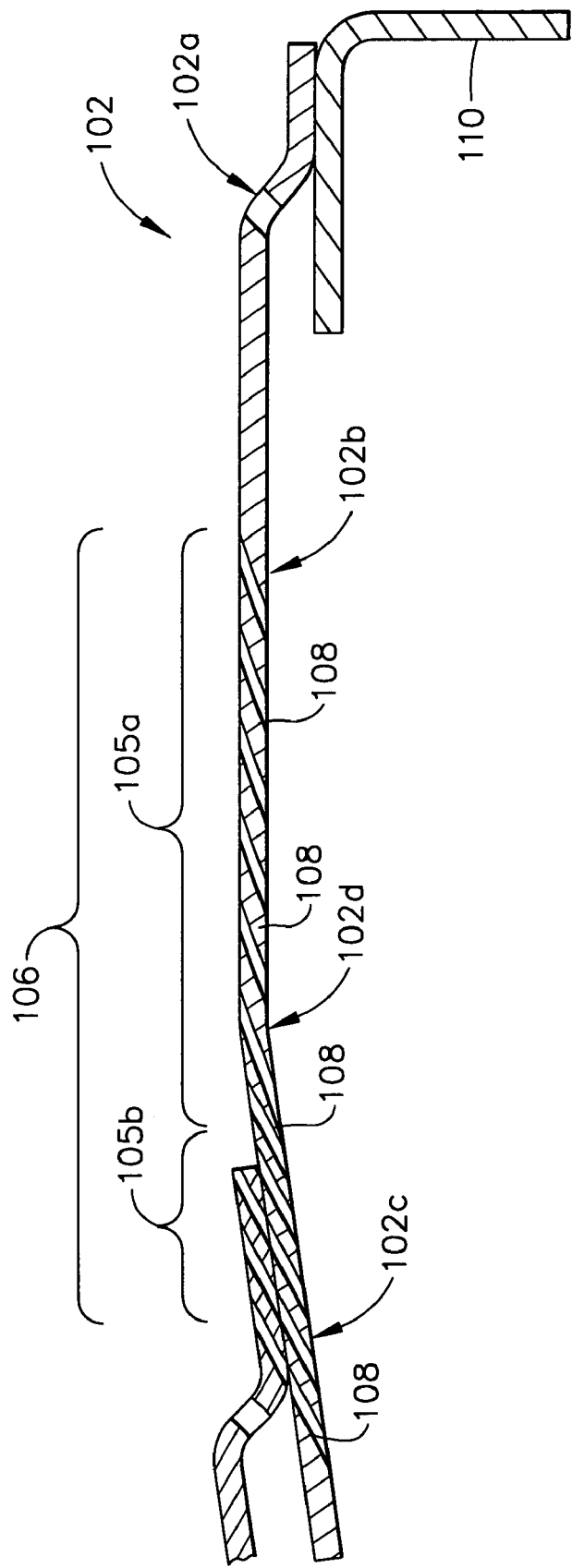
FIG. 2 is an enlarged, partial view of the outer panel subassembly shown in FIG. 1.

However, it can also be seen in FIG. 2 that the fifth and sixth rows of holes (starting from the left of the figure) straddle the transition area 102d, but do so in a configuration such that the holes from the fifth and sixth rows do not maintain the uniform separation seen between other adjacent rows, thereby causing stress in the transition area 102. In the embodiment shown in FIG. 5, the fifth and sixth rows likewise straddle the transition area 14d. But in contrast to the past design, the fifth and sixth rows of the present invention maintain the uniform spacing among adjacent rows.

In an exemplary embodiment, one or more of the effusion holes 15 can be at an angle 26 that is between about 15 and 25 degrees from a surface 20 of the outer panel 14a. About a 20 degree effusion hole angle 26 can be in another exemplary embodiment. It is understood by those skilled in the art that this range of angles for the effusion holes is illustrative, and not meant to be limiting. Also, there is no requirement that the angles 26 for each effusion hole be identical, but merely have a sufficient angle to create a film of sweeping air on the inner surface of the panel 14a.

Further, in this embodiment, one or more of the effusion holes 19, 15 of the modular inner and outer subassemblies can be generally circular in cross-section. Additionally, a diameter of the effusion hole 19, 15 can be between about $17/1000$ to $23/1000$ of an inch in size, and can be approximately $200/1000$ of an inch apart from a center of one effusion hole 19, 15 to another. However, there is no requirement that the diameters for each of the effusion holes 19, 15 be the same or different.

Figure 6:
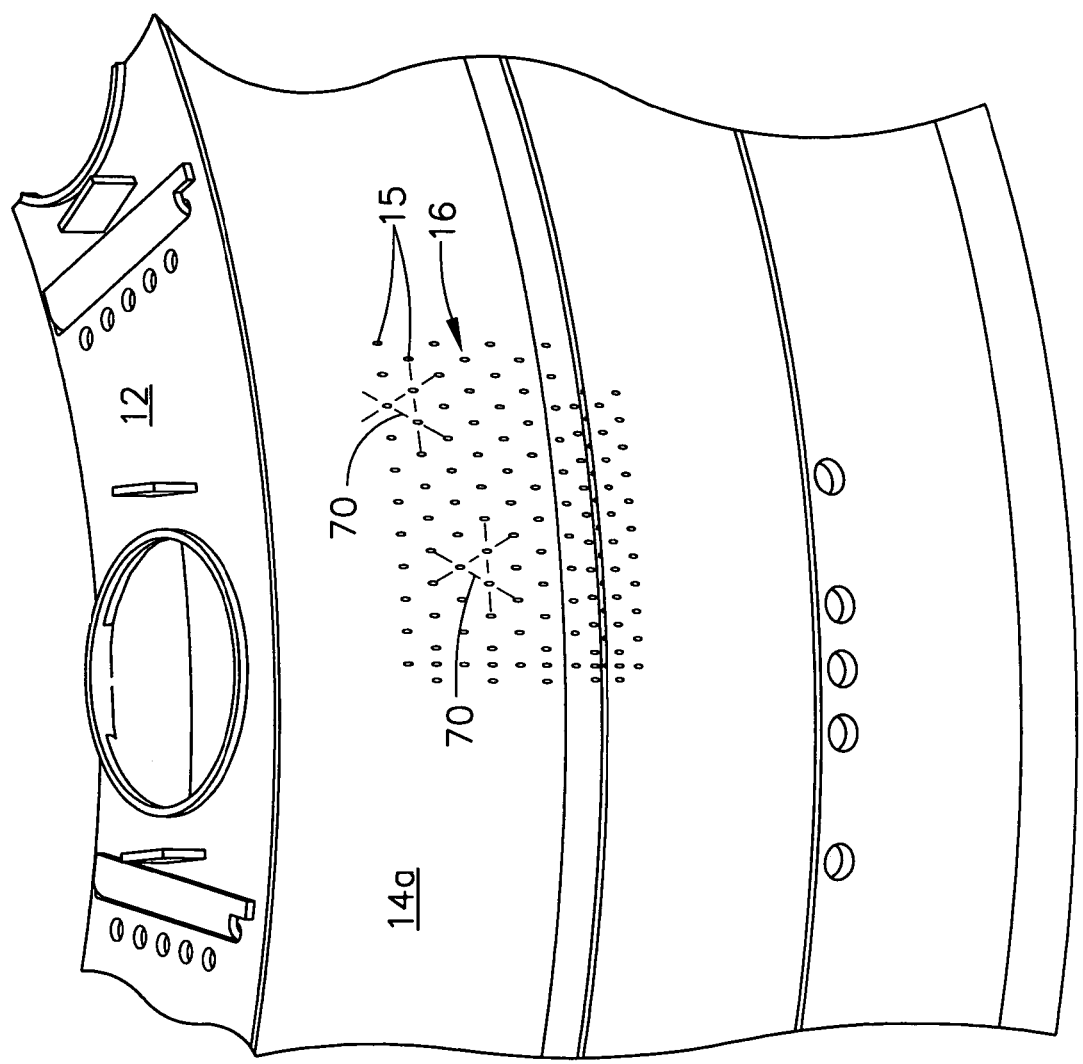
FIG. 6 is a partial side view of a modular outer panel subassembly and the dome subassembly of the present invention showing effusion holes configured in an equilateral triangle according to an embodiment of the present invention.

Additionally, as shown in FIG. 6, one or more of the rows 16 of effusion holes 15 in the modular outer panel subassemblies 13, can be offset from one another such that the holes 15 in adjacent rows 16 are positioned on apexes of an imaginary equilateral triangle 70. This equilateral triangular configuration 70 among adjacent rows of effusion holes maintains a uniform distance (although changing with the changing diameter of the modular outer panel 14a among the holes 15. Likewise, as shown in FIG. 4, one or more of the rows of effusion holes 19 in the modular inner panel subassemblies 13, can be offset from one another such that the holes 19 in adjacent rows are positioned on apexes of an imaginary equilateral triangle. This equilateral triangular configuration among adjacent rows of effusion holes maintains a uniform distance (although changing with the changing diameter of the modular inner panel 13a among the holes 19. In turn, the uniform configuration increases the durability of the modular inner and/or modular outer panels 13a, 14a.

As mentioned above, the modular outer panel subassembly 14a may include a flat portion 14b and an angled portion 14c. In the exemplary embodiment of FIG. 7, the angled portion 14c may be characterized by an angle 14e measured from a surface 18. In this embodiment, each angle 14e is different from one another. More specifically, in this example, the angle 14e for the panel closest to the dome subassembly 12 (not shown) is about 6.99 degrees, the angle 14e for the panel furthest from the dome subassembly 12 is about 11.54 degrees, and the angle 14e for the intermediate panel is about 7.64 degrees.

Similarly, as shown in FIG. 8, each inner panel 13a may include an angled portion 13c that can be characterized by an angle 13e as measured from a horizontal reference line 28. In this embodiment, and starting from the inner panel 13a that is most distal from the dome subassembly 12 (not shown), the angles may be 9.41, 5.48. 7.06, and 4.85 degrees. While the angles 13e, as well as the angles 14e may vary depending upon the application, such angles are important in that they can increase the efficiency of the combustor liner 10, in addition to its ease of manufacturability.

From the above, it can be appreciated that the present invention also provides a method for minimizing carbon-build up in a combustor liner. As an example, the method may include creating a film of air along an interior surface of the modular inner panel subassembly and/or the modular outer panel subassembly. For the inner panel subassembly, the air film may be created by a plurality of rows of effusion holes in one or more inner panels. For the outer panel subassembly, the air film may be created by a plurality of rows of effusion holes in one or more outer panels. The plurality of holes in the outer panel(s) may be divided into a first group and a second group. The first group may have six rows, each with 239 effusion holes, while the second group may have five rows, each with 281 effusion holes.

Furthermore, it can be appreciated that the combustor liner 10 is provided with a modular design in that the components are removeably affixed to one another. In other words, and as an example, the dome subassembly may be removed from the outer panel and/or inner panel subassemblies 13, 14 by removing the welded and/or brazed areas at points 12a and/or 12b. Once the dome subassembly 12 is removed, one or more of the outer panels 14a can be removed from the remaining outer panels 14a. The same can occur for the inner panels 13a. Since the outer panel subassembly 14 is un-affixed to the transition liner, and the inner panel subassembly 13 is un-affixed to the turbine section, the entire outer panel subassembly 14 and/or inner panel subassembly 13 may be removed from the combustor liner without removing a fixation means. The modular inner and/or outer panel subassemblies can then be efficiently replaced by welding and/or brazing completely manufactured modular subassemblies, including effusion cooling holes and thermal barrier coating, to the dome subassembly. By using completely manufactured modular subassemblies, to repair existing combustor liners, the quality of the repaired combustor liners is better controlled resulting in improved functionality and reliability.

Furthermore, it can be appreciated that the combustor liner 10 is provided with a modular design in that the components are removeably affixed to one another. In another example, the dome subassembly may be removed from the outer panel and/or inner panel subassemblies 13, 14 by cutting off the majority of the inner and outer panel below points 12a and/or 12b, but above the rows of effusion holes, leaving the dome assembly welded and/or brazed to the remaining inner and outer panel remnants. Once the dome subassembly 12 is removed, one or more of the outer panels 14a can be removed from the remaining outer panels 14a. The same can occur for the inner panels 13a. Since the outer panel subassembly 14 is un-affixed to the transition liner, and the inner panel subassembly 13 is un-affixed to the turbine section, the entire outer panel subassembly 14 and/or inner panel subassembly 13 may be removed from the combustor liner without removing a fixation means. The modular inner and/or outer panel subassemblies can then be efficiently replaced by welding and/or brazing completely manufactured modular subassemblies, including effusion cooling holes and thermal barrier coating, to the dome subassembly. By using completely manufactured modular subassemblies, to repair existing combustor liners, the quality of the repaired combustor liners is better controlled resulting in improved functionality and reliability.

Accordingly, and in reference to FIGS. 9A and 9B, the present invention additionally provides a method 900 of retrofitting non-effusion combustor liners with modular effusion panel subassemblies, in addition to a method 950 of repairing effusion panel subassemblies of a combustor liner, such as those described in connection with FIGS. 3–8. What is meant by "non-effusion" combustor liners and "non-effusion" panel subassemblies are combustor liners and panel subassemblies that have no effusion capability. In contrast, the term "effusion" combustor liners and "effusion" panel subassemblies refer to combustor liners and panel assemblies that have desired effusion capabilities, such as that described in connection with FIGS. 3–8.

Figure 9A:
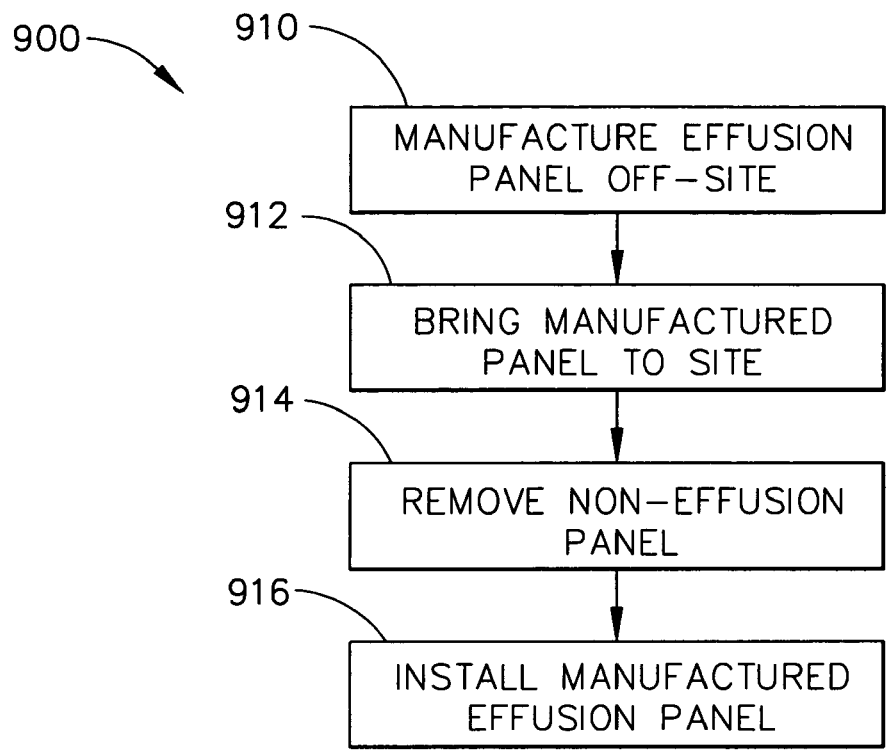
FIG. 9A is a flowchart depicting a method of converting a non-effusion combustor liner to an effusion combustor liner according to an embodiment of the present invention.

In the exemplary method 900 shown in FIG. 9A, a step 910 may include the off-site manufacture of a modular effusion panel subassembly, such as the inner panel subassembly 13 or outer panel subassembly 14. In other words, a non-effusion combustor liner may be in-service at a given location and the modular effusion panel subassemblies can be made at a different location. In a step 912, the manufactured panel subassembly can be brought on-site to the non-effusion combustor liner. In a step 914, either or both of the in-service inner and outer panel subassemblies that do not have desired effusion characteristics can be removed, such as by cutting the panel subassembly away from the dome assembly. In a step 916, the manufactured panel subassembly can be installed in place of the removed panel subassembly.

Figure 9B:
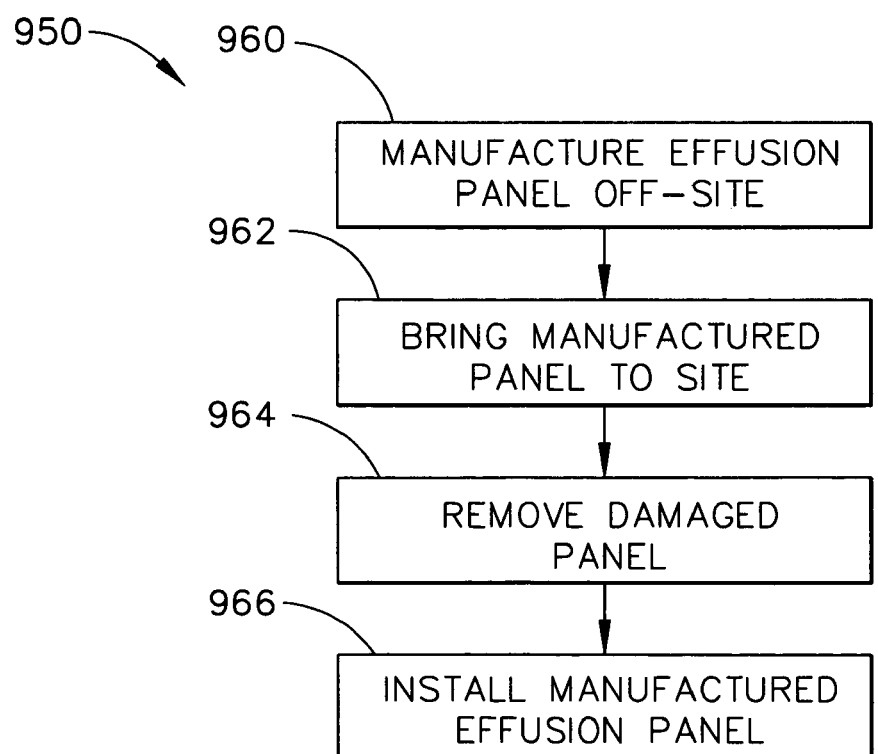
FIG. 9B is a flowchart depicting a method of repairing an effusion combustor liner according to another embodiment of the present invention.

Similarly, in the exemplary method 950 shown in FIG. 9B, a step 960 may include the off-site manufacture of a modular effusion panel subassembly or single effusion panel of such subassembly, such as the inner panel subassembly 13 or outer panel subassembly 14, as in the above step 910. In a step 962, the manufactured modular panel subassembly or panel can be brought on-site to a damaged combustor liner, as in step 912. In a step 964, either or both of the inner and outer panel subassemblies that may have been damaged can be removed. And in a step 966, the manufactured modular effusion panel subassembly is installed in place of the damaged subassembly.

In the event the damaged combustor liner is one made in accordance with the present invention as described above, at step 964, the weld and/or braze at point 12a can be removed in order to remove the inner panel subassembly, while the weld and/or braze at point 12b can be removed for the outer panel subassembly. Next, at step 966, a manufactured subassembly can replace the damaged subassembly.

In another embodiment where less than the entire panel subassembly is to be replaced, for example one damaged panel 14a of the outer panel subassembly 14, the weld and/or braze is removed that otherwise connects the damaged panel from at least one un-damaged panel. The replacement panel may then be welded and/or brazed to the un-damaged portion of the panel subassembly. Since the braze alloy used to braze the panels together may have a different melting point temperature than that used to braze the panel subassembly to the dome assembly, replacement of a panel may not affect the braze melting point at the dome assembly.

It should be understood, of course, that the foregoing relates to exemplary embodiments of the invention and that modifications may be made without departing from the spirit and scope of the invention as set forth in the following claims.

We claim:

1. A method of converting a non-effusion combustor liner to an effusion combustor liner comprising:
   removing at least one of a non-effusion inner panel and a non-effusion outer panel from said non-effusion combustor liner; and
   replacing said at least one non-effusion inner and outer panel with at least one of a modular inner effusion panel subassembly and a modular outer effusion panel subassembly, each subassembly including an effusion panel, and said modular outer effusion panel subassembly comprising six rows of first effusion holes proximate to one end of said effusion panel and wherein at least one of said six rows includes 239 first effusion holes and five rows of second effusion holes distal from said one end of said effusion panel and wherein at least one of said five rows includes 281 second effusion holes.

2. The method of claim 1, wherein said modular inner effusion panel subassembly comprises one of:
   four rows of third effusion holes and wherein at least one of said four rows includes 181 third effusion holes; and
   five rows of fourth effusion holes and wherein at least one of said five rows include 206 fourth effusion holes.

3. The method of claim 1, wherein said liner panel subassemblies are removeably affixed to a dome subassembly of said combustor liner.

4. The method of claim 3, wherein said liner panel subassemblies comprise both the modular outer panel subassembly and inner panel subassembly.

5. The method of claim 1, wherein said modular inner liner pane subassembly comprises a plurality of inner panels removeably affixed to one another.

6. The method of claim 1, wherein said modular outer liner panel subassembly comprises a plurality of outer panels removeably affixed to one another.

7. A method of converting a non-effusion combustor liner to an effusion combustor liner, comprising:
   making a first modular effusion liner panel subassembly remote from said non-effusion combustor liner;
   removing a first non-effusion liner panel subassembly from said non-effusion combustor liner;
   replacing said first non-effusion liner panel subassembly with said first modular effusion liner panel subassembly;
   wherein said first modular effusion liner panel subassembly includes:
   six rows of first effusion holes proximate to one end of said first effusion liner panel subassembly and wherein at least one of said six rows includes 239 first effusion holes; and
   five rows of second effusion holes distal from said one end of said first effusion liner panel subassembly and wherein at least one of said five rows includes 281 second effusion holes.

8. The method of claim 7, further comprising:
   removing a second non-effusion liner panel subassembly from said non-effusion combustor liner; and
   replacing said non-effusion liner panel subassembly with a second modular effusion liner panel subassembly.

9. The method of claim 8, wherein said second modular liner panel subassembly includes one of:
   four rows of third effusion holes and wherein at least one of said four rows includes 181 third effusion holes; and
   five rows of fourth effusion holes and wherein at least one of said five rows include 206 fourth effusion holes.

10. The method of claim 7, wherein said first modular effusion liner panel subassembly is removeably affixable to a dome subassembly of said combustor liner.

11. The method of claim 10, wherein said first modular effusion liner panel subassembly comprises:
    a first outer panel subassembly; and
    a second inner panel subassembly that interfaces said first outer panel subassembly.

12. A method of repairing a combustor liner, comprising:
    making a first modular effusion panel of a first modular liner panel subassembly remote from said combustor liner;
    removing a first damaged panel from said combustor liner;
    replacing said first damaged panel with said first modular effusion panel;
    wherein said first modular effusion panel includes:
    six rows of first effusion holes proximate to one end of said first effusion panel and wherein at least one of said six rows includes 239 first effusion holes; and
    five rows of second effusion holes distal from said one end of said first effusion panel and wherein at least one of said five rows includes 281 second effusion holes.

13. The method of claim 12, further comprising:
    making a second modular effusion panel of a second modular liner panel subassembly remote from said combustor liner;
    removing a second damaged panel from said combustor liner;
    replacing said second damaged panel with said second modular effusion panel;
    wherein said second modular effusion panel includes one of:
    four rows of third effusion holes and wherein at least one of said four rows includes 181 third effusion holes; and
    five rows of fourth effusion holes and wherein at least one of said five rows include 206 fourth effusion holes.

14. The method of claim 13, wherein said making a second modular effusion panel includes making at least one of said third effusion holes and fourth effusion holes remote from said combustor liner.

15. The method of claim 13, wherein said removing said first and second damaged panels includes removing one of said first and second damaged panels from a dome subassembly of said combustor liner.

16. The method of claim 13, wherein said removing said first and second damaged panels includes removing one of said first and second damaged panels from an un-damaged panel of said combustor liner.

17. The method of claim 12, wherein said making a first modular effusion panel includes making at least one of said first effusion holes and second effusion holes remote from said combustor liner.

18. A method of repairing a combustor liner, comprising:
    making a modular effusion panel of a liner panel subassembly remote from said combustor liner;
    removing a damaged panel from said combustor liner;
    replacing said damaged panel with said modular effusion panel;
    wherein said modular effusion panel comprises one of a first modular effusion panel and a second modular effusion panel;

said first modular effusion panel including:
six rows of first effusion holes proximate to one end of said first effusion panel and wherein at least one of said six rows includes 239 first effusion holes; and
five rows of second effusion holes distal from said one end of said first effusion panel and wherein at least one of said five rows includes 281 second effusion holes;
said second modular effusion panel including one of:
four rows of third effusion holes and wherein at least one of said four rows includes 181 third effusion holes; and
five rows of fourth effusion holes and wherein at least one of said five rows include 206 fourth effusion holes.

19. The method of claim 18, wherein said making modular effusion panels includes making at least one of said first effusion holes, second effusion holes, third effusion holes, and fourth effusion holes remote from said combustor liner.

20. The method of claim 18, wherein said removing said damaged panel includes removing said damaged panel from a dome subassembly of said combustor liner.

21. The method of claim 18, wherein said removing said damaged panel includes removing said damaged panel from an un-damaged panel of said combustor liner.

22. The method of claim 18, wherein at least three of said first and second effusion holes are arranged in an equilateral triangle configuration.

23. The method of claim 18, wherein at least one of said first and second effusion holes is characterized by an angle between about 15 and 25 degrees.

24. The method of claim 18, wherein at least one of said first and second effusion holes is characterized by a diameter about $171/1000$ and $23/1000$ inches.

25. The method of claim 18, wherein at least two of said first and second effusion holes are separated by about $200/1000$ inches.

26. The method of claim 18, wherein said combustor liner is part of a turbine engine.

* * * * *